J. D. LEWIS.
Hoof-Protector.

No. 224,704.          Patented Feb. 17, 1880.

Witnesses.
F. L. Ourand
E. H. Bradford

Inventor.
Jas. D. Lewis
By H. J. Ennis
Attorney.

UNITED STATES PATENT OFFICE.

JAMES D. LEWIS, OF OSHKOSH, WISCONSIN.

HOOF-PROTECTOR.

SPECIFICATION forming part of Letters Patent No. 224,704, dated February 17, 1880.

Application filed December 9, 1879.

*To all whom it may concern:*

Be it known that I, JAMES D. LEWIS, of Oshkosh, in the county of Winnebago and State of Wisconsin, have invented certain new and useful Improvements in Hoof-Protectors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of hoof-protectors for horses which consist of an elastic covering adapted to fit over the hoof; and it has for its object to provide for better securing the device upon the hoof and prevent injury to the same by the heel-calks; and to this end the invention consists in a hoof-protector provided with raised ribs or pads on the inside of the sole, and having apertures at the toe and heel, through which the calks may project, as more fully hereinafter specified.

Figure 1:
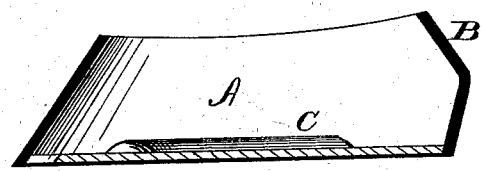
Figure 2:
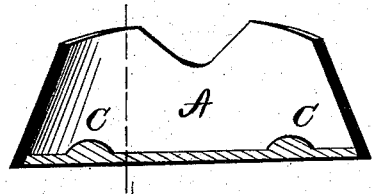
Figure 3:
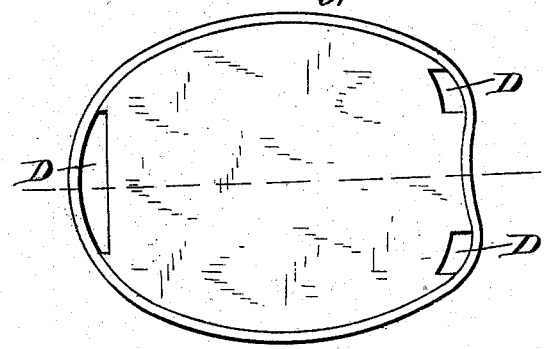

In the drawings, Figure 1 indicates a vertical section on the line $x$ $x$ of Fig. 2. Fig. 2 represents a transverse section, and Fig. 3 a bottom view of my improved housing.

The letter A indicates the hoof-protector, which is made of vulcanized india-rubber or caoutchouc, or other equivalent elastic material, of such conformation as to fit snugly the exterior of the hoof of a horse. The rear or heel portion of said hoof-protector is inclined inwardly at its upper edge, as shown at B, in order to fit over the heel of the animal as well as the rear portion of the hoof, in order to keep the said hoof-protector in place and protect the heel from injury from the other hoofs of the horse.

The bottom or sole of the hoof-protector is provided on its inside with two curved ribs or pads, C, so located as to fit inside of the shoe proper and prevent the hoof-protector from being shifted laterally, and at the toe and heel, respectively, the said sole or bottom is provided with apertures D, through which the toe and heel calks of the shoe proper project to prevent injury to the hoof-protector and to give the animal proper foot-hold, especially upon icy or other smooth surfaces.

The said hoof-protector is to be applied by simply slipping it over the hoof of the animal, to effect which object it is simply necessary to distend the sides, which, being elastic, spring back to a normal position when released, securing the hoof-protector firmly to the hoof.

Having thus fully described my invention, what I claim, and desire to secure by Letters Patent of the United States, is—

A protector for hoofs of animals constructed of rubber or other elastic material, provided with raised ribs or pads on the inside or bottom of the sole, and having apertures at the toe and heel, through which the toe and heel calks may project, substantially as and for the purposes specified.

In testimony that I claim the foregoing I have hereunto set my hand this 2d day of December, 1879.

JAMES D. LEWIS.

Witnesses:
WILLIAM R. KENNEDY,
JOHN H. MEARS.